United States Patent [19]

Egarian

[11] Patent Number: 4,956,002
[45] Date of Patent: Sep. 11, 1990

[54] METHOD FOR THE COMPOSTING OF ORGANIC MATERIALS

[76] Inventor: David J. Egarian, 129 Minnehaha Blvd., Lake Hiawatha, N.J. 07034

[21] Appl. No.: 439,828

[22] Filed: Nov. 21, 1989

[51] Int. Cl.$^5$ ............................ C05F 9/04; C05F 9/02
[52] U.S. Cl. .............................................. 71/9; 71/11; 71/12; 71/901; 422/184

[56] References Cited

U.S. PATENT DOCUMENTS

| | | | |
|---|---|---|---|
| 3,756,784 | 9/1973 | Pittwood | 422/184 |
| 3,764,290 | 10/1973 | Spohn | 71/9 |
| 4,288,241 | 9/1981 | Shelef | 71/9 |
| 4,552,726 | 11/1985 | Grappelli et al. | 422/184 |

FOREIGN PATENT DOCUMENTS

| | | | |
|---|---|---|---|
| 2201789 | 8/1972 | Fed. Rep. of Germany | 71/9 |
| 2451284 | 5/1976 | Fed. Rep. of Germany | 71/9 |

*Primary Examiner*—Ferris H. Lander
*Attorney, Agent, or Firm*—Lerner, David, Littenberg, Krumholz & Mentlik

[57] ABSTRACT

Modular systems are disclosed for composting organic waste. The systems include a number of modular containers for holding predetermined amounts of the organic waste materials, these amounts being selected such that a relatively uniform temperature profile may be maintained within each of the modular containers. Each of the containers also includes an air inlet and an exhaust so that air may be circulated through the organic waste materials in each of the modular containers, a temperature probe for measuring the temperature in the modular containers, and a fan for circulating air from the exhaust of a first modular container to the air inlet of a second modular container when the temperature in the second modular container is greater than the temperature in the first modular container by a predetermined temperature difference, so as to accelerate the composting of said organic waste material.

39 Claims, 2 Drawing Sheets

METHOD FOR THE COMPOSTING OF ORGANIC MATERIALS

This is a continuation, of application Ser. No. 07/326,496 filed 3/17/89 which is a continuation of application Ser. No. 07/069,373, filed 7/2/87, both now abandoned.

FIELD OF THE INVENTION

The present invention relates to methods and apparatus for composting organic waste material. More particularly, the present invention relates to modular systems for composting organic waste materials, and particularly such systems which accelerate such composting. Still more particularly, the present invention relates to methods and apparatus for composting organic waste materials which include the circulation of air through the organic materials to facilitate such composting.

BACKGROUND OF THE INVENTION

The aerobic composting of organic materials as a means of the disposal and/or recycling of such waste materials has gained increased acceptance in the recent past. Early work on composting technology was performed by Sir Albert Howard, a British agronomist, who developed the Indore Process through research performed in India. In 1972, the United States Department of Agriculture's Beltesville Agricultural Research Center began research for an improved method of windrow composting of sewage sludge. That research culminated in what is commonly known today as the "Beltesville process," as is set forth in a 1980 publication entitled "Manual for Composting Sewage Sludge by the Beltesville Aerated Pile Method." Additional such research on aerated static piles was performed by the New Jersey Agricultural Experiment Station at Cook College, Rutgers - the State University of New Jersey at the Camden County, New Jersey composting facility. The Rutgers research resulted in an improvement to the "Beltesville Process" primarily in the utilization of process control technology. This improvement has come to be known as the "Rutgers Method." Both the "Beltesville" and "Rutgers" static pile methods take place outdoors in compost piles of similar configuration. Two pile configurations were thus developed which employed individual static piles ("static" because each pile stands alone and is undisturbed or unagitated during a 21 day composting cycle), and the extended aeration process was used in which static piles from each day's production are stacked adjacent to one another to form one long, outdoor, continuous pile.

Along with the development of these open systems, enclosed systems were also being developed both in Europe and the United States. Europe's clusters of dense population centers dictated a need to recycle their organic waste in a manner which would have minimum impact upon local residents. The Europeans therefore developed large silo, tunnel and drum systems with internal process controls. In these systems, each of the composting units contains the entirety of the composting mass inputted over the composting cycle. These systems are represented by U.S. Pat. Nos. 4,236,910; 4,062,770; 4,184,269; 4,191,643; 4,161,426; 4,288,241; 4,132 638; and 4,255,389.

Such reactor-type systems were also developed in the United States, and these additional systems are represented by U.S. Pat. Nos. 4,139,640; 3,114,662; 4,138,333; 3,533,775; 3,556,420; 3,151,779; 3,438,710; 3,385,687; 3,291,491; 3,323,896; 3,963,470; 4,410,349; and 3,890,129.

These various open and closed composting systems currently utilize aerobic digestion to varying degrees in attempts to control the internal composting environment, as represented by the pH, moisture content, pile temperature, porosity, nutrient levels and oxygen levels for the compost pile. Of these two types of systems, the open pile systems require the minimum capital outlay. However, the actual design and construction of these open systems have resulted in unexpected operational and process performance problems. That is, because these piles are generally either triangular or trapezoidal in cross section, a temperature distribution occurs such that temperatures on the surface of the pile are significantly less (i.e., closer to ambient) than the temperatures at the center of the pile, thus yielding incomplete thermal pathogen destruction. Furthermore, insulation blankets of finished compost are sometimes utilized, but in extremely cold weather this does not negate these problems. In such cold weather, the outer surface also tends to freeze, and in addition leachate which is drawn into the blower casing may also freeze, thus causing blower failure. Furthermore, the exposure of all of the mechanical equipment to the open environment and freezing weather shortens the overall service life of this equipment. These open systems also create working conditions for plant operators which can become rather severe in both the winter and in the summer, when prolonged hot, dry periods can produce excessive dust. The mixing of such static pile systems is normally performed by mobile equipment, thus resulting in poor mix ratio control, as well as dense zones which can become anaerobic. Odor problems are common in open systems due to anaerobic pockets caused by poor mixing and ventilation patterns. Since these piles are exposed, dust problems can occur with resultant increased spore levels on the site. Furthermore, because these static piles normally undergo a 21 day aeration period, followed by a 30 to 45 day unaerated curing period, odor problems sometimes occur during the unaerated cure period. Also, in these open, forced aeration systems, it is generally not possible to collect exhaust gases for scrubbing of odor-causing compounds therefrom.

The various in-vessel systems have thus been designed to remedy many of these environmental problems associated with open static piles. In view of their high rates of digestion through very careful control of the internal environment, most of these systems are exemplified by an initial stabilization period within the vessel, followed by an aerated curing period. These systems also feature vessels which contain the entire volume of waste material production in one composting mass. That is, if the composting cycle is 14 days, then 14 days of waste material production are contained within the vessel. This arrangement thus results in expensive structures, as well as complex, expensive mechanical equipment, in order to accomplish the initial placement and extraction of the waste material. Control systems for these systems also tend to be complex, due to the amount of equipment which needs to be controlled. Furthermore, the extraction device is of great concern in such enclosed systems, since failure of same can result in prolonged vessel downtime, and providing for redundancy in the extraction device is technically difficult, expensive, and sometimes impossible. In any case, such extraction devices must also be serviced on a regular basis, and without redundancy the actual composting time per year could be reduced, since restarting a vessel (filling) could take as long as six weeks. Providing for redundancy of vessels, however, is an expensive solution to the problem. Further, the great depth of material results in expensive blowers, as well as a concern for internal air distribution patterns.

One attempt to solve these problems is shown in U.S. Pat. No. 4,288,241. In this system two open windrow-type piles are placed adjacent to each other, and air is drawn down through one of the piles by a blower and blown up through the second pile. Control is accomplished by a timer in this system, and the volume of air provided is intended to dry out the piles. Depleted moisture content is thus restored by adding wet sewage sludge during the process.

It is therefore an object of the present invention to overcome the deficiencies of this and other prior art systems by the provision of a modular composting system so as to accelerate that process.

SUMMARY OF THE INVENTION

In accordance with the present invention, these and other objects have now been achieved by the applicant's invention of a modular system for composting organic waste which comprises a plurality of modular containers including at least first and second modular containers for holding predetermined amounts of the organic waste material, the predetermined amounts being such that a relatively uniform temperature profile can be maintained within each of the plurality of modular containers, each of the first and second modular containers including air inlet means and exhaust means so that air can be circulated through the waste material in each of the first and second modular containers, temperature measuring means for measuring the temperature in the first and second modular containers, and circulation means for circulating air from the exhaust means of the second modular container to the air inlet means of the first modular container when the temperature in the second modular container is greater than the temperature in the first modular container by a predetermined temperature difference, in order to accelerate the composting of the organic waste material therein. In accordance with preferred embodiment, the air inlet means are located at the bottom of the modular containers and the exhaust means are located at the upper surface of the modular containers, so that the air is circulated upwardly therethrough.

In accordance with one embodiment of the modular systems for the present invention, the circulation means includes fan means for forcing the air through the organic waste material in the modular containers. The modular containers preferably also include leachate drain means at the bottom surface thereof for the withdrawal of leachate formed in the organic waste material therefrom. In a further preferred embodiment the fan means includes a plurality of fans for each of the plurality of modular containers.

In accordance with a preferred embodiment of the modular system of the present invention, the circulation means includes valve means for circulating a first supply of air through the first modular container and a separate second supply of air through the second modular container when the temperatures in the first and second modular containers differ by less than the predetermined temperature difference.

In accordance with another embodiment of the modular systems of the present invention, carbonaceous material addition means are provided for adding carbonaceous material to the organic waste material in order to control the carbon content of the organic waste material. In a preferred embodiment the systems include bulk material addition means for adding a bulking agent to the organic waste material in order to control the porosity of the organic waste material therein. In a preferred embodiment weighing means are provided for determining the weight of organic waste material, as well as mixing means for mixing the organic waste material. In a highly preferred embodiment, process control means are provided to control the carbonaceous material addition means and the bulk material addition means in response to the weight of the organic waste material as determined by the weighing means.

In accordance with another embodiment of the modular system of the present invention, the predetermined amount of the organic waste material comprises approximately a one day's supply thereof, and the plurality of modular containers includes at least fourteen such modular containers, so that approximately a two week's supply of the organic waste material can be contained within the modular system at any given time. In a preferred embodiment the fourteen modular containers are paired into seven pairs of first and second modular containers, with each of those pairs comprising modular containers containing organic waste material supplied to the system at approximately seven-day intervals.

In accordance with the method of the present invention, the method includes supplying predetermined amounts of organic waste material to a plurality of modular waste containers including a first modular container and a second modular container, the predetermined amounts being selected so that a relatively uniform temperature profile may be maintained within each of the plurality of modular containers, circulating air through the predetermined amounts of organic waste material in each of the first and second modular containers, measuring the temperature in the first and second modular containers, and circulating at least a portion of the air which has passed through the organic waste material in the second modular container to the organic waste material in the first modular container when the temperature in the second modular container is greater than the temperature in the first modular container by a predetermined temperature difference, in order to accelerate the composting of the organic waste material therein. In a preferred embodiment the circulating of the air through the predetermined amounts of organic waste material comprises passing the air upwardly through the organic waste material therein.

In accordance with one embodiment of the method of the present invention, the method includes withdrawing leachate created by the organic waste material from the modular containers.

In accordance with another embodiment of the method of the present invention, the method includes circulating a first supply of air through the first modular container and a separate second supply of air through the second modular container when the temperatures in the first and second modular containers vary by less than the predetermined temperature difference.

In accordance with one embodiment of the method of the present invention, the method includes adding carbonaceous material to the organic waste material prior to the supplying of the organic waste material to the modular containers, in order to control the carbon content of the organic waste material. In a preferred embodiment the method also includes adding bulk material to the organic waste material prior to the supplying of the organic waste material to the plurality of modular containers, in order to control the porosity of the organic waste material. In a preferred embodiment the method includes weighing the organic waste material prior to the addition of the organic waste material to the modular containers, and preferably also mixing the organic waste material prior thereto.

In a particularly preferred embodiment, the method of the present invention includes controlling the amount of the carbonaceous material and the amount of the bulk material added to the organic waste material in response to the determination of the weight of the organic waste material. In a particularly preferred embodiment the predetermined amounts of the organic waste material comprise approximately a one day's supply thereof, and supply of the predetermined amounts to the modular containers includes supplying same to fourteen modular containers whereby approximately two weeks' supply of organic waste material can be contained therein. Preferably the method includes pairing the fourteen modular containers into seven pairs such that each of the pairs of modular containers includes organic waste material supplied to the system at approximately seven-day intervals.

The modular systems in accordance with this invention not only afford the inherent economic efficiency and simplicity of the outdoor static pile, but also the environmental and control advantages which are realized by enclosing the pile. An aeration system is thus provided hereby which negates the harmful effects of winter composting, and at the same time accelerates composting through an innovative method of reusing waste heat. The present systems provide for high rates of aerobic decomposition to occur in two multi-unit modular clusters. Each of these modules contains the volume of organic waste which is produced in one day, along with the required amount of added carbon-containing material and bulking agent. The material will then remain in its assigned module, which is both totally enclosed and still accessible through an access door and other suction and discharge ports, for the initial composting period. The material will preferably be piled from wall to wall, thus yielding a uniform cross section for aeration. Orifices in the bottom air piping will preferably be sized in order to create equal backpressure along the entire pipeline, and most importantly, each module is separate and distinct from each other module, with its own aeration, control and leachate collection systems.

Furthermore, as compared to many of the prior art systems, including those of U.S. Pat. No. 4,288,241, the modular units of the present invention are preferably constructed in a manner such that modular units which contain organic waste material which has been placed in those units at intervals of seven days can be placed in juxtaposition with each other for the purpose of recirculating heat therethrough. The air movement system of the present invention is thus primarily predicated upon the removal and reuse of heat, and not strictly for purposes of air drying by a timer or the like. Thus separate blowers are preferably assigned to each of the enclosed modular units of the present invention and designed to blow air up through the pile, which is far superior to drawing air down through a pile. The present invention thus provides for the rapid composting of these organic waste materials to a stabilized material without the use of an external wetting agent, so that moisture control can be effected by heat removal and recirculation through the temperature control system hereof.

Since mixing is an extremely important factor in obtaining the desired porosity, moisture and nutrient control, all input materials are preferably metered and mechanically mixed together. Separate bins are thus employed for each of the constituents, and they each include variable speed outfeed devices which operate in response to signals generated by meters located on each output conveyor. Thus, an exact volumetric ratio can be attained which is specifically designed to yield optimum compost module input characteristics. These characteristics will depend on the organic waste being processed.

The input mixture can then be transported to a designated compost module by means of mobile equipment or by conveyor Piles are then constructed inside the module by mobile equipment, and removed by mobile equipment at the end of the compost period. Since the modules are readily accessible, this important and flexible feature of the static pile system is retained, circumventing the complex materials handling systems required of other enclosed systems which are inaccessible once the material is placed therein.

BRIEF DESCRIPTION OF THE DRAWINGS

The following detailed description of the present invention can be more fully understood with reference to the figures in which.

DETAILED DESCRIPTION

Figure 1:
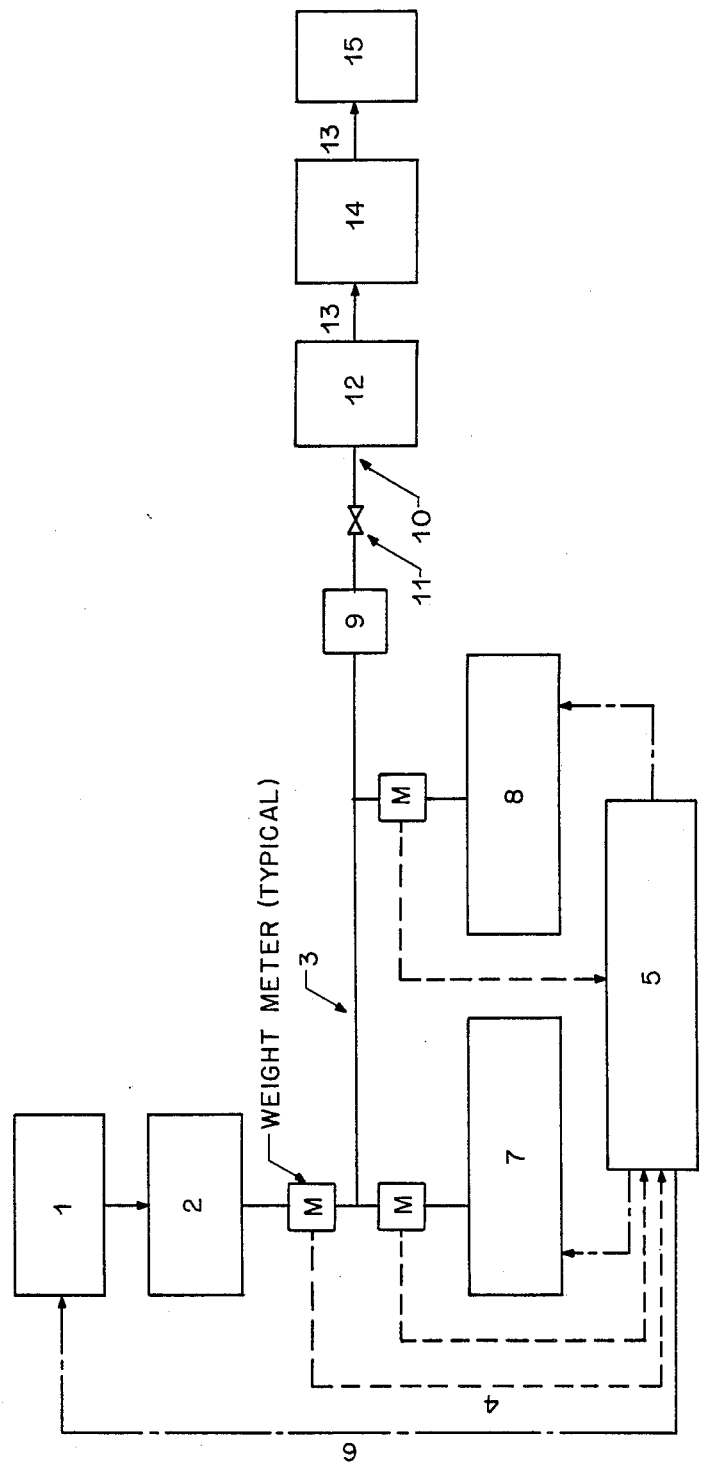
FIG. 1 is a schematic flow chart of a material flow diagram to be used in accordance with the system of the present invention.

Referring to the Figures, in which like numerals refer to like portions thereof, FIG. 1 shows organic waste material being deposited into a day bin 1 for processing by the system of the present invention. Some organic wastes may require initial shredding in shredder 2, and if that is the case, such shredding can be effected upon discharge of the organic waste from the day bin 1. The discharge from the day bin/shredder is thereby deposited onto a conveyor system 3. The conveyor 3 is equipped with a scale for weighing the waste material, and then sending a signal 4 to a process controller 5. The process controller 5 then converts the signal from the scale corresponding to the weight of organic waste to a volumetric signal, which can then be compared to a predetermined set point. Control output 6 from the process controller 5 to the day bin 1 can then speed up or slow down the output rate, as desired, based upon this comparison of the volumetric signal, to thus act as a modulator for the variable speed output device.

The input to the composting units 12 will be at certain desired solids contents, porosity, and carbon-to-nitrogen ratios (C:N). Therefore, depending upon the particular organic waste which is to be composted, the addition of carbonaceous material from a carbonaceous addition unit 7 may be required in order to obtain appropriate adjustment of the C:N ratio. These two constituents can be retained in bins 7 and 8 with variable speed outfeed devices and scales (metering systems)

similar to that associated with the organic waste bin 1. The process controller 5 can thus vary the output rates thereof in order to attain the volumetric ratio representing the ideal input mixture.

This mixture is then delivered by conveyor 3 to a mechanical mixer 9 for creating relatively homogeneous material. This material is then transported to the active compost modules 12 by conveyor or mobile equipment 10. A conveyor bypass allows material to be transported by mobile equipment in case of a conveyor failure. After the initial aerobic composting period, the compost can be removed by mobile equipment 13 to the curing module cluster 14. Following curing, the finished material can then be moved by mobile equipment 13 to storage area 15. The ideal utilization of the system of this invention calls for the total amount of mixed organic material produced in one day to be deposited into one individual totally enclosed module for the particular type of waste which is to be composted. For example, the material from day one is deposited into module one, from day two into module two, and so on. The material can then remain in those modules for the full composting cycle. This procedure is followed until all of the modules are filled. Once the material in module one has completed the compost cycle, it can then be removed to a second cluster of modules of similar configuration to begin the aerated curing period. Fresh raw material can then be placed into module one, to begin a new composting cycle, thus keeping module one in continuous service. In this manner, all of the modules are thus kept in service at all times. The modules themselves should be arranged in such a manner so that module one is adjacent to module eight, module two is adjacent to module nine, and so on. The modules are arranged in this manner so that one pile is at thermophillic temperature when the adjacent pile is at its coolest, i.e., at pile start-up.

Once the organic material has been deposited in a module, and an access door closed, a totally enclosed environment will exist. Temperature probes placed at various elevations from overhead can then control the operation of the blower which is dedicated to that module. It is thus possible to control the operation of the blower from any temperature control element by means of the control system. The aeration rate can thus be varied by means of the on/off time as well as the speed of the blower Furthermore, the $CO_2$ and $O_2$ levels can also be monitored in the exhaust gas. Then, operation of the blower can be overridden manually in response to variations in the desired values therefor.

Figure 2:
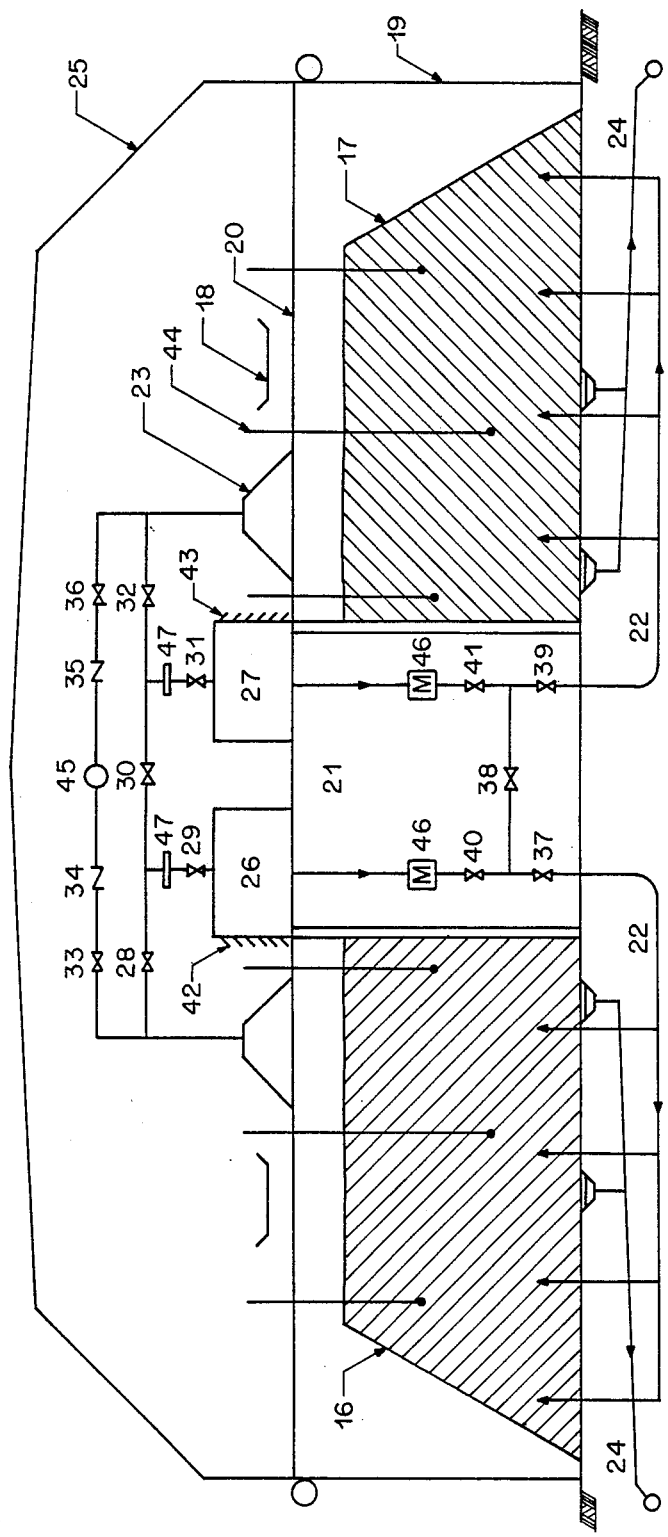
FIG. 2 is a partially schematic, partially cross sectional view of two adjacent modular containers in accordance with the present invention.

Turning to FIG. 2, a typical cross section through two adjacent modules containing such material whose ages are seven days apart is shown therein. The modules are thus preferably configured in such a way as to have module no. 1 opposite module no. 8, module no. 2 opposite module no. 9, etc. For descriptive purposes, it is thus assumed that material pile 16 in module one is seven days old, and that material pile 17 in module eight has just been constructed, i.e., by delivery of same by mobile equipment or overhead conveyor 18. The module itself can be sealed by a side-wall construction, a sealed access door 19, and a sealed roof construction 20. A roof enclosure 25 provides a comfortable work environment for operators, as well as protection for mechanical equipment. An access tunnel 21 separates the two modules, and monitoring instruments can be located within this access tunnel 21. Air supply piping 22 feeds air by means of forced ventilation through the pile, to an exhaust hood 23 which is located above the pile. An underdrain system 24 collects leachate produced by the organic material and pipes same to underground storage tank(s), which are not shown in the Figures. Each module has a dedicated blower, with a bypass valve connecting fan nos. and 8, 2 and 9, etc., thus providing full redundancy in case of blower failure. The exhaust piping is configured in such a way so as to permit recirculation of air from one module to another. As noted above, the modules are staggered seven-days apart, thus allowing one module to be at thermophillic temperatures while the other is at minimum temperatures (at start-up). Recirculation is thus effected until thermophillic temperatures are achieved in the newly started module. This system allows for rapid pile heat-up by excluding outside, cooler air, an innovation which will accelerate the composting process as compared to other current systems. Further, air may be recirculated from the newer pile to the older pile for the purpose of moisture replenishment. As moisture can become a limiting factor in the rate of decomposition, this system feature enables high decomposition rates to continue, with only the quantity of putrescible material as the limiting factor Referring again specifically to FIG. 2, supply fan and air mixing chamber 26 supplies air to the compost pile 16 in module one, and supply fan and air mixing chamber 27 supplies air to compost pile 17 in module eight. The air may be directed a number of ways by means of valves 28 through 41. Thus, when air is being recycled from compost pile 16 to compost pile 17, valves 28, 30, 31, 35, 36, 37, 39, 40 and 41 will be open, while valves 29, 32, 33, and 34 are closed. Furthermore, adjustable louver 42 will be open, and adjustable louver 43 will be closed. This aeration scheme can thus be utilized until pile 17 achieves thermophillic temperatures. Fan 26 can be operated in order to maintain a temperature between about 55° to 60° C. in response to temperature probes 44, thus driving off heat through ventilation and evaporative cooling. Excess heat driven off in this manner is thus passed directly through pile 17, and it can then be exhausted to other uses, as well as to odor control, through a central discharge pipe 45. In this mode fan 27 is electrically interlocked with fan 26.

When thermophillic temperatures have then been achieved in both of these piles, fans 26 and 27 can then be run independently by means of separate temperature control systems In this case, valves 33, 34, 35, 36, 37, 39, 40 and 41 will thus be open, as are adjustable louvers 42 and 42, and valves 28, 29, 30, 31, 32 and 38 are closed.

In some circumstances, with certain organic wastes having particular material contents, it may be desirable to use a combination of recirculating air and fresh air. Thus, several intake valves may be used which are partially open so as to allow fresh air to be mixed with the recirculated air therein Moisture transfer can also be effected by the recirculation of air from one module to another. That is, assuming that the material in pile 16 (module one) has a higher moisture content than that of pile 17 (module eight), which would be the case if pile 16 were the newer pile, the necessary transfer sequence to obtain appropriate moisture transfer to the pile 17, with the lower moisture content, would be identical to that described above for heat transfer from pile 16 to pile 17.

In the case of blower failure, bypass valves 37 through 41 can be utilized to permit fan 26 or 27 to supply air to both piles, at least on an interim basis. For example, if fan 26 fails, fan 27 can supply air to both piles by closing valve 40 and opening valves 37, 38, 39 and 41. The actual air flow can be metered by air meters 46, and a removable air filter 47 can be utilized to entrap airborne dust particles.

It is also possible to manually override the temperature controls for the blowers in response to the deviation of any $CO_2$ and $O_2$ readings from desired values. The actual air flow rates to each module can be measured and compared to desired values. Furthermore, when recirculating air, particular attention should be given to the $CO_2$ and $O_2$ content of the recirculated air stream.

The present invention thus represents a number of significant improvements over the open static pile system. Firstly, the entire module is at a substantially uniform temperature, thus eliminating large temperature differentials within the pile. Also, surface freezing is eliminated, and there is no need to employ an insulation blanket. Exhaust gases are collected and scrubbed for odor control, and dust problems are eliminated through enclosure within the module, and through the use of air filters in the exhaust system. Leachate is readily captured in this system by permanent in-slab piping, and then piped to a holding tank. Also, the potential problem of the freezing of leachate in air piping is eliminated by the use of this system, and the exhaust gases can be used to warm-up the carbon addition and bulking agent bins.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A modular system for composting organic waste materials comprising a plurality of self-contained modular containers including a first modular container and a plurality of second modular containers for holding predetermined amounts of said organic waste materials for substantially the entire composting period, said plurality of modular containers having a size such that a relatively uniform temperature profile may be maintained within each of said plurality of modular containers, said first modular container holding said predetermined amount of said organic waste material which has been composting for a first period of time and said plurality of second modular containers holding said predetermined amounts of said organic waste material which have been composting for a plurality of second periods of time, said plurality of second periods of time being progressively shorter than said first period of time, each of said first and said plurality of second modular containers including air inlet means and exhaust means whereby air may be circulated through said predetermined amounts of said organic waste materials in each of said first and said plurality of second modular containers, temperature measuring means for measuring the temperature in said first and said plurality of second modular containers, interconnection means for selectively interconnecting said first modular container with a selected one of said plurality of second modular containers based upon said measured temperature of said selected one of said second plurality of containers being less than said temperature of said first modular container by a predetermined temperature difference, and circulation means for circulating ambient air separately through said first and said selected one of said plurality of second modular containers and for alternatively circulating ambient air through said first modular container and circulating said air from said exhaust means of said first modular container to the air inlet means of said selected one of said plurality of second modular containers, so as to accelerate the composting of said organic waste material in said selected one of said plurality of second modular containers.

2. The modular system of claim 1 wherein each of said plurality of modular containers includes a bottom surface and an upper surface, and wherein said air inlet means are located at said bottom surface of said modular containers and said exhaust means are located at said upper surface of said modular containers.

3. The modular system of claim 2 wherein said plurality of modular containers includes leachate drain means at said bottom surface of said modular containers for the withdrawal of leachate formed in said organic waste material therein.

4. The modular system of claim 1 wherein said circulation means includes fan means for forcing said air through said organic waste material in said plurality of modular containers.

5. The modular system of claim 4 wherein said fan means comprises a plurality of fan means for each of said plurality of modular containers, said first fan means for said first modular container and a plurality of second fan means for said plurality of second modular containers, respectively.

6. The modular system of claim 1 including carbonaceous material addition means for adding carbonaceous material to said organic waste material so as to control the carbon content of said organic waste material.

7. The modular system of claim 6 including bulk material addition means for adding a bulking agent to said organic waste material as to control the porosity of said organic waste material.

8. The modular system of claim 7 including weighing means for determining the weight of said organic waste material.

9. The modular system of claim 8 including mixing means for mixing said organic waste material.

10. The modular system of claim 8 including process control means for controlling said carbonaceous material addition means and said bulk material addition means in response to the weight of said organic waste material as determined by said weighing means.

11. The modular system of claim 1 wherein said predetermined amount of said organic waste material comprises approximately a one-day supply of said organic waste material, and wherein said plurality of modular containers comprises at least fourteen modular containers, whereby approximately two-weeks supply of said organic waste material may be contained within said modular system.

12. The modular system of claim 11 wherein said fourteen modular containers are paired into seven pairs of said second modular containers, with each of said pairs comprising modular containers containing organic waste material supplied to said system at approximately seven-day intervals.

13. The modular system of claim 1 including enclosure means for enclosing said plurality of modular containers.

14. A method for composting organic waste materials comprising supplying predetermined amounts of said organic waste martial to a plurality of modular containers including a first modular container and a plurality of second modular containers, holding said predetermined amount of said organic waste material which has been composting for a first period of time in said first modular container and holding said predetermined amounts of said organic waste material which have been composting for a plurality of second periods of time in said plurality of second modular containers, said second periods of time being progressively shorter than said first period of time, said predetermined amounts being selected so that a relatively uniform temperature profile may be maintained within each of said plurality of modular containers, circulating air through said predetermined amounts of said organic waste material in each of said first and said plurality of second modular containers, measuring the temperature in said first and said plurality of second modular containers, interconnecting said first modular container with a selected one of said plurality of second modular containers based upon the measured temperature of said selected one of said plurality of second modular containers being less than said measured temperature of said first modular container by a predetermined temperature difference, and circulation at least a portion of said air which has passed through said organic waste material in said first modular container to said organic waste material in said selected one of said second modular containers, so as to accelerate the composting of said organic waste material in said selected one of said second modular containers.

15. The method of claim 14 wherein said circulating of said air through said predetermined amount of said organic waste material comprises passing said air upwardly through said organic waste material.

16. The method of claim 14 including withdrawing leachate created by said organic waste material from said plurality of modular containers.

17. The method of claim 14 including circulating a first supply of ambient air through said first modular container and a separate second supply of ambient air through said selected one of said plurality of second modular containers when said temperatures in said first and said selected one of said plurality of second modular containers vary by less than said predetermined temperature difference.

18. The method of claim 14 including adding carbonaceous material to said organic waste material prior to the supplying of said organic waste material to said plurality of modular containers, so as to control the carbon content of said organic waste material.

19. The method of claim 18 including adding bulk material to said organic waste material prior to the supplying of said organic waste material to said plurality of modular containers, so as to control the porosity of said organic waste material.

20. The method of claim 19 including weighing said organic waste material prior to the addition of said organic waste material to said plurality of modular containers.

21. The method of claim 20 including controlling the amount of said carbonaceous material and the amount of said bulk material added to said organic waste material in response to the determination of the weight of said organic waste material.

22. The method of claim 14 including mixing said organic waste material prior to the addition of said organic waste material to said plurality of modular containers.

23. The method of claim 14 wherein said predetermined amounts of said organic waste material comprise approximately a one-day supply of said organic waste material, and wherein said supplying of said predetermined amounts of organic waste material to said plurality of modular containers comprises supplying said predetermined amounts of organic waste materials to fourteen of said modular containers, whereby approximately two-weeks supply of said organic waste material may be contained therein.

24. The method of claim 23 including pairing said fourteen modular containers into seven pairs of said modular containers, in a manner such that each of said pairs of said modular containers includes organic waste materials supplied to said system at approximately seven-day intervals.

25. A modular system for composting organic waste materials comprising a plurality of modular containers including a first modular container and a second modular container for holding predetermined amounts of said organic waste materials for substantially the entire composting period, said plurality of modular containers having a size such that a relatively uniform temperature profile may be maintained in each of said plurality of modular containers, each of said first and second modular containers including air inlet means and exhaust means whereby air may be circulated through said predetermined amount of said organic waste materials in a first direction from said air inlet means to said exhaust means in each of said first and second modular containers, temperature measuring means for measuring the temperature in said first and second modular containers, and circulation means for circulating ambient air separately through said first and second modular containers in said first direction and for alternatively circulating ambient air through said first modular container in said first direction and circulating said air from said exhaust means of said first modular container to said air inlet means of said second modular container for circulating said air through said second modular container in said first direction, when said temperature in said first modular container is greater than said temperature in said second modular container by a predetermined temperature difference, so as to accelerate the composting of said organic waste material in said second modular container.

26. The modular system of claim 25 wherein each of said plurality of modular containers includes a bottom surface and an upper surface, and wherein said air inlet means are located at said bottom surfaces of said modular containers and said exhaust means are located at said upper surfaces of said modular containers, whereby said first direction comprises an upward direction in each of said modular containers.

27. The modular system of claim 25 wherein said circulation means includes fan means for forcing said air through said organic waste material in said plurality of modular containers.

28. The modular system of claim 27 wherein said circulation means includes valve means.

29. A modular system for composting organic waste materials composting a plurality of self-contained modular containers including a first modular container and a plurality of second modular containers for holding predetermined amounts of said organic waste materials for substantially the entire composting period, said plurality of modular containers having a size such that a relatively uniform temperature profile may be maintained within each of said plurality of modular containers, said first modular container holding said predetermined amount of said organic waste material which has been composting for a first period of time and said plurality of second modular containers holding said predetermined amounts of said organic waste material which have been composting for a plurality of second periods of time, said plurality of second periods of time being progressively shorter than said first period of time, each of said first and second modular containers including air inlet means and exhaust means whereby air may be circulated through said predetermined amounts of said organic waste materials in each of said first and said plurality of second modular containers, temperature measuring means for measuring the temperature in said first and said plurality of second modular containers, interconnection means for interconnecting said first modular container with a selected one of said plurality of second modular containers based upon said measured temperature of said selected one of said plurality of second modular containers being less than said measured temperature of said first modular container by a predetermined temperature difference, and circulation means for circulating air from said exhaust means of said first modular container to said air inlet means of said selected one of said plurality of several modular containers.

30. The modular system of claim 29 wherein the direction from said air inlet means to said exhaust means in each of said first and said plurality of said second modular containers comprises a first direction, and wherein said circulation means includes valve means for circulating air from said exhaust means of said first modular container to said air inlet means of said selected one of said plurality of second modular containers for circulating said air through said selected one of said second modular containers in said first direction.

31. The modular system of claim 30 wherein said circulation means includes means for alternatively circulating ambient air separately through said first and said selected one of said plurality of second modular containers in said first direction.

32. The modular system of claim 31 wherein each of said plurality of modular containers includes a bottom surface and an upper surface, and wherein said air inlet means are located at said bottom surfaces of said modular containers and said exhaust means are located at said upper surfaces of said modular containers, wherein said first direction comprises an upward direction.

33. The modular system of claim 32 wherein said plurality of modular containers includes leachate drain means at said bottom surfaces of said modular containers for the withdrawal of leachate formed in said organic waste material therein.

34. A method for composting organic waste materials comprising supplying a first predetermined amount of said organic waste material to a first modular container, composting said first predetermined amount of said organic waste material in said first modular container for a first period of time, supplying a second predetermined amount of said organic waste material to a second modular container, composting said second predetermined amount of said organic waste material in said second modular container for a second period of time, said first period of time being longer than said second period of time whereby said organic waste material in said first modular container has progressed to a greater degree of composting than said organic waste material in said second modular container, and each of said first and second predetermined amounts of said organic waste material in said first and second modular containers being selected so that a relatively uniform temperature profile may be maintained within each of said modular containers, and being entirely composed of organic waste material which has been composting for substantially the same periods of time, circulating air through said predetermined amounts of said organic waste material in each of said first and second modular containers during said first and second periods of time, and circulating at least a portion of said air which has passed through said organic waste material in said first modular container to said organic waste material in said second modular container when said temperature in said first modular container is greater than said temperature in said second modular container by a predetermined temperature difference, so as to accelerate the composting of said organic waste material in said second modular container.

35. The method of claim 34 wherein said circulating of said air through said predetermined amounts of said organic waste material in each of said first and second modular containers is carried out in a first direction.

36. The method of claim 35 wherein said first direction comprises an upward direction through said organic waste material.

37. The method of claim 34 including circulating a first supply of ambient air through said first modular container and a separate second supply of ambient air through said second modular container when said temperatures in said first and second modular containers vary by less than said predetermined temperature difference.

38. The method of claim 34 including adding carbonaceous material to said organic waste material prior to the supplying of said organic waste material to said plurality of modular containers, so as to control the carbon content of said organic waste material.

39. The method of claim 38 including adding bulk material to said organic waste material prior to the supplying of said organic waste material to said plurality of modular containers, so as to control the porosity of said organic material.

* * * * *

UNITED STATES PATENT AND TRADEMARK OFFICE
CERTIFICATE OF CORRECTION

PATENT NO. : 4,956,002

DATED : September 11, 1990

INVENTOR(S) : Egarian

It is certified that error appears in the above-identified patent and that said Letters Patent is hereby corrected as shown below:

Column 2, line 1, delete "3,151,779" and insert therefor --3,451,779--; delete "3,438,710" and insert therefor --3,438,740--.
Column 2, line 2, delete "3,291,491" and insert therefor --3,294,491--.
Column 8, line 6, after "nos.", insert --1--.
Column 10, line 62, delete "second".
Column 12, line 64, delete "composting" and insert therefor --comprising--.

Signed and Sealed this

Twenty-eighth Day of January, 1992

Attest:

HARRY F. MANBECK, JR.

*Attesting Officer*      Commissioner of Patents and Trademarks